Oct. 7, 1969          A. L. GOOD          3,470,698

PNEUMATIC CONTROL SYSTEM AND SELECTOR MEANS THEREFOR OR THE LIKE

Filed March 15, 1968          3 Sheets-Sheet 1

INVENTOR
ARTHUR L. GOOD

BY *Cauder & Cauder*

HIS ATTORNEYS

INVENTOR
ARTHUR L. GOOD

BY

HIS ATTORNEYS

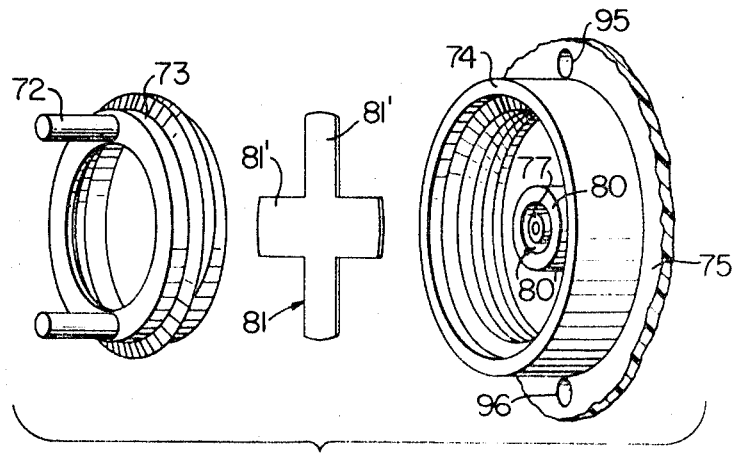
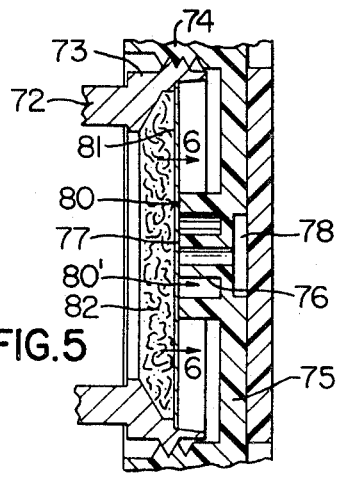
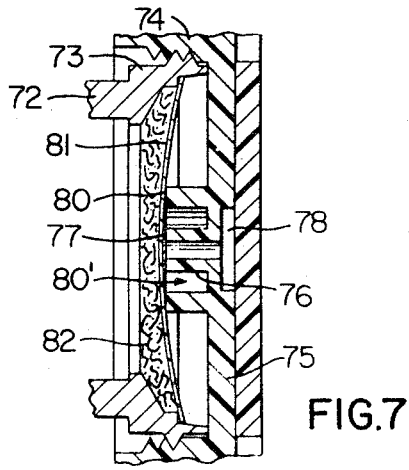
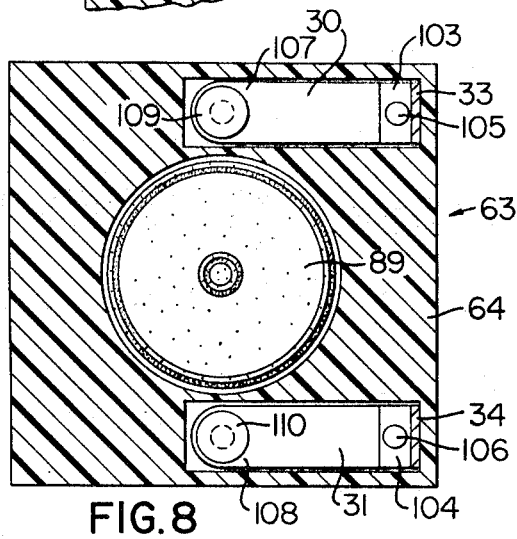
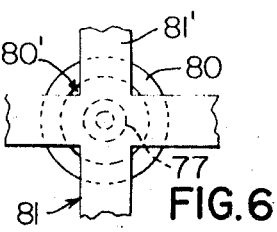
INVENTOR
ARTHUR L. GOOD

United States Patent Office 3,470,698
Patented Oct. 7, 1969

3,470,698
PNEUMATIC CONTROL SYSTEM AND SELECTOR
MEANS THEREFOR OR THE LIKE
Arthur L. Good, Elkhart, Ind., assignor to Robertshaw
Controls Company, Richmond, Va., a corporation of
Delaware
Filed Mar. 15, 1968, Ser. No. 713,388
Int. Cl. F15b 11/06; F26b 19/00
U.S. Cl. 60—60
30 Claims

ABSTRACT OF THE DISCLOSURE

This disclosure relates to a pneumatic control system wherein a manually operated selector means has a control knob which when axially moved from a first position thereof to a second position thereof permits a pneumatic source to be fluidly interconnected to pneumatically operated actuator means of the system and simultaneously creates the source of pneumatic fluid, the control means when rotated between a third position thereof and a fourth position thereof varying the degree of an air bleed means leading to the pneumatically operated actuator means to control the regulation thereof.

---

This invention relates to a pneumatic control system as well as to an improved manually operated selector means for such a control system or the like.

It is well known that pneumatic control systems have been provided for domestic appliances, such as washing machines, dishwashers and the like, wherein a timer moved program member is adapted to sequentially interconnect a pneumatic source to a plurality of pneumatically operated actuators so that as each actuator is actuated in predetermined pattern, the actuated actuators will cause particular functions of the apparatus to take place.

Accordingly, it is a feature of this invention to provide an improved pneumatic control system of the above type with the control system of this invention having unique selector means for operating the same.

In particular, the selector means of this invention includes a movable control means which is adapted to be axially moved relative to the selector housing means from a first positon thereof to a second position thereof wherein the control means disconnects the atmosphere from the control system so that the pneumatic source can be directed to the control system to operate the actuator means thereof, the control means when in the second axial position thereof also turning on a pneumatic pump to provide the pneumatic source fluid for the control system. In addition, the control means is rotatable relative to the selector housing means from a third position thereof to a fourth position thereof to vary the degree of an air bleed means interconnected to one of the actuators so as to control the degree of actuation thereof for a purpose hereinafter described.

Accordingly, it is an object of this invention to provide an improved pneumatic control system having one or more of the novel features set forth above or hereinafter shown or described.

Another object of this invention is to provide an improved selector means for such a control system or the like, the selector means of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 4 is an exploded perspective view of certain parts of the selector means of FIGURE 2.

FIGURE 5 is an enlarged partial cross-sectional view of one of the operating parts of the selector means of FIGURE 2.

FIGURE 6 is a fragmentary cross-sectional view taken substantially on line 6—6 of FIGURE 5.

FIGURE 7 is a view similar to FIGURE 5 and illustrates the parts in another operating position thereof.

FIGURE 8 is a cross-sectional view taken substantially on line 8—8 of FIGURE 2.

Figure 1:
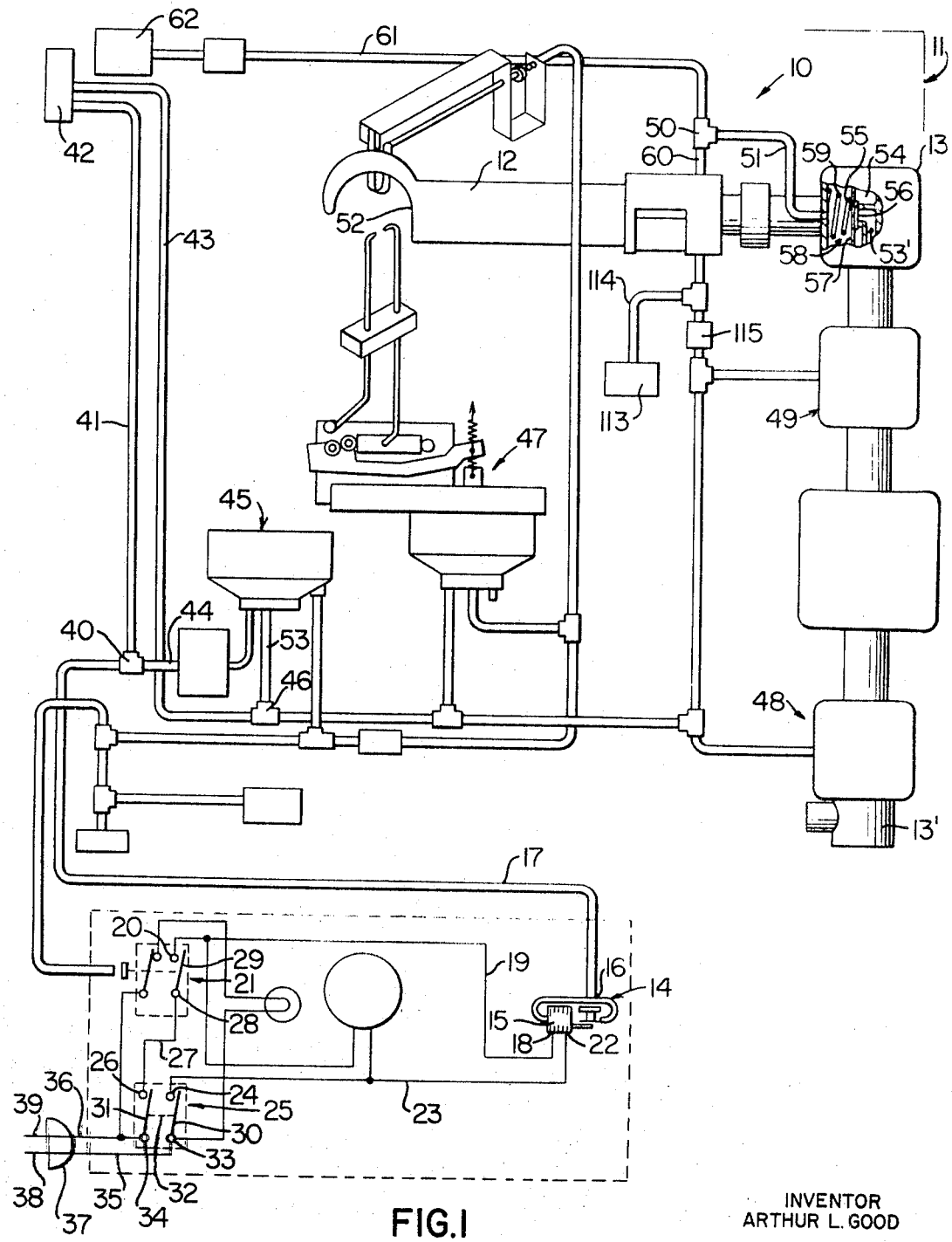
FIGURE 1 is a schematic view illustrating the pneumatic control system of this invention.

While the various features of this invention are hereinafter described and illustrated as being particularly adaptable to provide a control system for a laundry drying machine, it is to be understood that the various features of this invention can be utilized singly or in any combination thereof to provide control means for other devices as desired.

Therefore, this invention is not to be limited to only the embodiments illustrated in the drawings, because the drawings are merely utilized to illustrate one of the wide variety of uses of this invention.

Referring now to FIGURE 1, the pneumatic control system of this invention is generally indicated by the reference numeral 10 and is being utilized to control a laundry drying machine or apparatus generally indicated by the reference numeral 11 and having a main burner means 12 adapted to be supplied fuel from a source conduit 13' being interconnected to the burner means 12 by a pneumatically operated valve means or actuator 13 in a manner hereinafter described.

The control system 10 includes an electromagnetically driven vacuum pump 14 having an electrical coil 15 which when energized will drive the pump 14 that has its inlet side 16 interconnected to a conduit 17. One side 18 of the coil 15 is interconnected to a lead 19 that is interconnected to an electrical contact 20 of a door operated electrical switch 21, the other side 22 of the electrical coil 15 being interconnected by a lead 23 to an electrical contact 24 of a manually operated electrical switch 25.

Another electrical contact 26 of the manually operated electrical switch 25 is interconnected by a lead 27 to a contact 28 of the door operated switch 21 with the contact 28 being electrically interconnected to a switch blade 29.

The manually operated electrical switch 25 includes a pair of switch blades 30 and 31 interconnected together by a tieing means 32 to move in unison with switch blades 30 and 31 being respectively electrically interconnected to electrical contacts or terminals 33 and 34 of the switch 25. The contacts 33 and 34 are respectively interconnected by leads 35 and 36 to a plug 37 having the conventional two prongs 38 and 39 for plugging into a conventional 110 volt AC outlet receptacle to supply electrical current for the system 10 for a purpose hereinafter described.

When the door of the dryer 11 is disposed in its closed position, such door operates the switch 21 to move the switch blade 29 against the contact 20 so that when the control system 10 is turned on by a selector means of this invention in a manner hereinafter described, the switch blades 30 and 31 are respectively moved against the electrical contacts 24 and 26 to place the coil 15 of the pump 14 across the prongs 38 and 39 of the plug 37 to energize the same whereby the pneumatic pump 14 will be continuously operating to supply a vacuum source for the control system 10 as long as the switches 21 and 25 are in their closed conditions.

The conduit 17 leading from the inlet side 16 of the vacuum pump 14 is interconnected to one branch of a T-connector 40 that has another branch thereof interconnected to a conduit 41 leading to a valve means 42. Another conduit 43 also leads to the valve means 42 that forms part of the selector means of this invention in a manner hereinafter described and being so constructed and arranged that when the selector means of this invention is disposed in its "off" position, the conduits 41 and 43 are respectively interconnected to the atmosphere and when the selector means is disposed in its "on" position, the valve means 42 closes the conduits 41 and 43 from the atmosphere and from each other for a purpose hereinafter described.

The remaining branch of the T-connector 40 is interconnected by conduit means 44 to a pneumatically operated actuator 45.

The previously described conduit 43 is interconnected by a T-connector 46 to various other conduit means of the system 10 that lead to pneumatically operated actuator means 47, 48 and 49 as well as to one branch of a T-connector 50 that has another branch thereof interconnected by a conduit 51 to the previously described pneumatically operated valve means 13 which is also considered as a pneumatically operated actuator as will be apparent hereinafter.

The actuator 47 comprises an ignition means for creating electrical sparks at the outlet end 52 of the main burner means 12 to ignite the fuel issuing therefrom when the pneumatically operated valve means 13 is actuated in a manner hereinafter described, the ignition means and details of the actuator 47 do not form part of this invention and, therefore, need not be further described.

The actuator 45 previously described is adapted to interconnect the conduit 44 to a conduit 53 that leads to one branch of the previously described T-connector 46 when the actuator 45 has been moved from its deactuated condition to its actuated condition by the pneumatic source 14 being interconnected thereto by the conduit 17. However, since the valve means 42 is normally adapted to interconnect the conduit 41 to the atmosphere, the valve means 42 must dead end the conduit 41 from the atmosphere before the vacuum pump 14 can evacuate the actuator 45 to move the same to its actuated position. Once the actuator 45 has been moved to its actuated position, the conduit 44 is interconnected by the actuated actuator 45 to the conduit 53 so that the vacuum pump 14 is now interconnected to the other conduits of the system to operate the actuator means 47, 48, 49 and 13 if the valve means 42 is also closing or dead-ending the conduit 43 from the atmosphere as will be apparent hereinafter.

The pneumatically operated valve means 13 includes an inlet passage 53' separated from an outlet passage 54 leading to the burner means 12 by a valve seat 55, the valve seat 55 being opened and closed by a valve member 56 carried on a flexible diaphragm 57 that cooperates with the housing means 13 to define a chamber 58 disposed in fluid communication with the conduit 51. A compression spring 59 is disposed in the chamber 58 and normally tends to move the diaphragm 57 and valve member 56 to the right in FIGURE 1 to close the valve seat 55 when the chamber 58 is at atmospheric condition.

However, the control system 10 of this invention is adapted in a manner hereinafter described to control the degree of evacuation of the chamber 58 so as to control the degree of opening of the valve member 56 relative to the valve seat 55 to control the amount of flow of fuel from the source conduit 13' to the burner means 12 and, thus, control the temperature effect of the burner means 12 for the dryer 11 as will be apparent hereinafter.

As illustrated in FIGURE 1, one branch of the T-connector 50 is interconnected to conduit means 60 that leads to the T-connector 46 whereby when the actuator 45 is moved to its actuated condition to interconnect the vacuum source 14 to the T-connector 46, the T-connector 50 thereby will interconnect the vacuum pump 14 to the chamber 58 to evacuate the same. However, the remaining branch of the T-connector 50 is interconnected by a conduit means 61 to a manually operated variable air bleed means 62 which will be set by the housewife or the like to permit air to bleed at a controlled rate through the valve means 62 into the chamber 58 of the pneumatically operated valve means 13 so that the vacuum pump 14 also being interconnected to the chamber 58 will only open the valve means 56 away from the valve seat 55 in an amount set by the air bleed means 62 so that the flow of fuel to the burner means 12 will be substantially in relation to the setting of the variable air bleed means 62 as will be more fully described hereinafter.

The improved selector means of this invention for operating the manual switch means 25, the valve means 42 and the variable air bleed means 62 of the control system 10 of FIGURE 1 is generally indicated by the reference numeral 63 in FIGURES 2–8 and will now be described.

Figure 2:
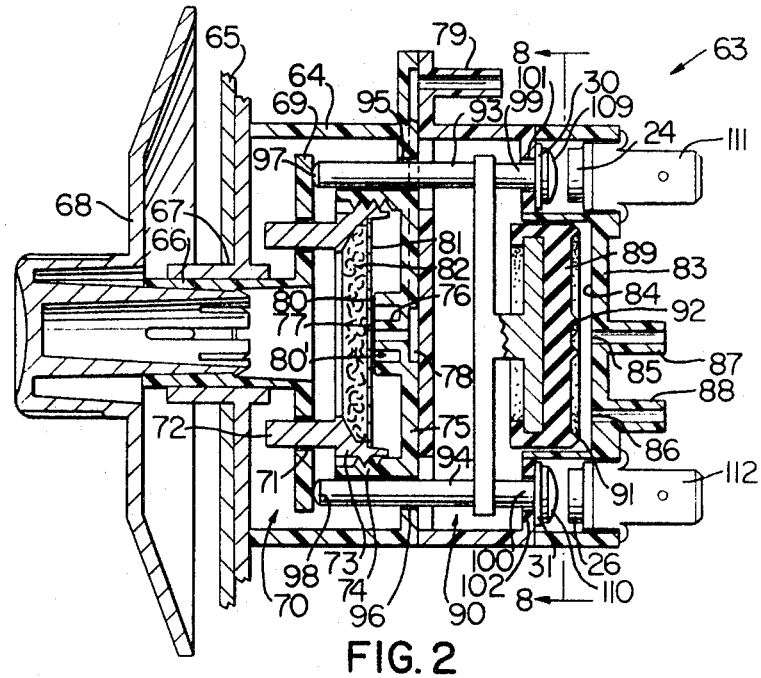
FIGURE 2 is a cross-sectional view of a selector means of this invention being utilized in the control system of FIGURE 1.

As illustrated in FIGURE 2, the selector means 63 includes a housing means 64 adapted to be secured to a control panel 65 of the apparatus 11 and have a control shaft means 66 thereof pass through an opening 67 in the control panel 65 to carry a control knob 68 outboard of the control panel 65 to be manually operated by the housewife or the like.

The control shaft or means 66 carries a disc-like member 69 to the right thereof and disposed in a chamber 70 of the housing means 64, the disc-like member 69 having a plurality of openings 71 passing therethrough and telescopically receiving projections 72 of an externally threaded member 73 to spline the control shaft 66 to the threaded member 73. In this manner, the threaded member 73 is rotatable in unison with the control knob 68 while the control knob 68 and shaft means 66 is adapted to be axially movable relative to the threaded member 73 for a purpose hereinafter described.

An internally threaded tubular member 74 extends from an internal wall means 75 of the housing means 64 and threadedly receives the threaded member 73 therein whereby rotation of the threaded member 73 by the control knob 68 will control the degree of threaded relationship between the threaded member 73 and the stationary threaded part 74 for a purpose hereinafter described.

The internal wall means 75 of the housing means 64 has a tubular extension 76 that defines a valve seat 77 at the left hand end thereof fluidly interconnected by internal passage means 78 of the wall means 75 to a tubular extension or nipple means 79 that is interconnected to the conduit 61 of the control system 10 previously described. An annular abutment means 80 is concentrically disposed about the annular valve seat 77 in spaced relation relative thereto to define a groove 80' and is adapted to be engaged by a spider-shaped flexible valve member 81 having its outer periphery carried by the threaded member 73.

For example, when the control knob 68 has been rotated relative to the housing means 64 to provide the threaded relation between the threaded members 73 and 74 in the manner illustrated in FIGURE 5, the flexible valve member 81 is disposed against the valve seat 77 and is not bowed by the annular abutments 80 so that the valve member 81 completely closes the valve seat 77 from the atmosphere as illustrated in FIGURE 6 as the legs 81' of the spider valve member 81 prevent fluid communication of the valve seat 77 with the groove 80' between the valve seat 77 and the abutment 80.

However, as the threaded member 73 is further threaded into the threaded part 74 of the housing 64 by further rotation of the control knob 68 in the proper direction, the flexible valve member 81 is progressively bowed against the annular abutment means 80 to progressively open the valve seat 77 to the groove 80' in the manner illustrated in FIGURE 7 to progressively vary the amount of air that is adapted to bleed into the previously described conduit 61 of the system 10. Such air bleed can be filtered by a porous compressible filter material 82 that is carried by the threaded member 73 and fills the same as illustrated.

An end wall 83 of the housing means 64 has a flat interior surface 84 interrupted by a pair of ports 85 and 86 respectively disposed in fluid communication with tubular extensions or nipple means 87 and 88 respectively interconnected to the conduit means 43 and 41 of the control system 10 previously described.

Figure 3:
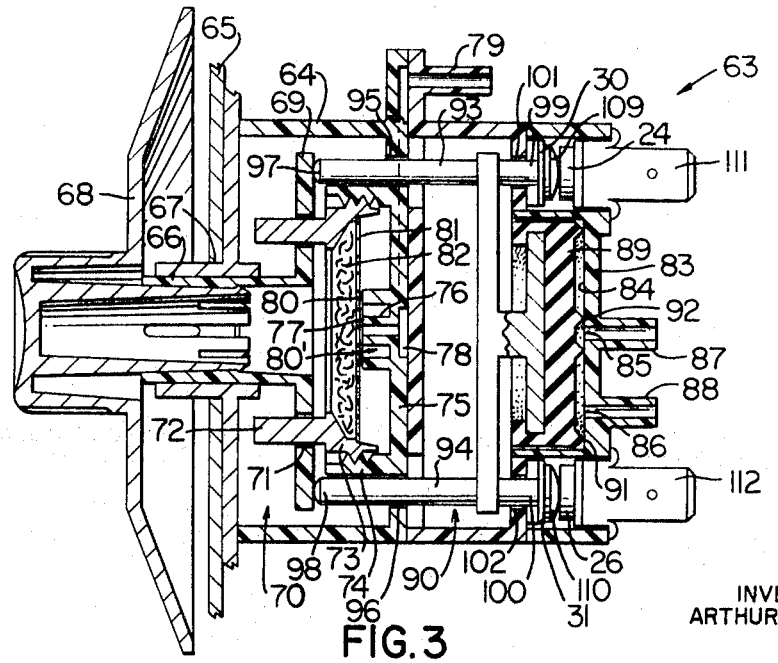
FIGURE 3 is a view similar to FIGURE 2 and illustrates the selector means in another operating position thereof.

A valve member 89 is movably carried by the housing means 64 and is disposed in a chamber 90 thereof, the valve member 89 having a first annular ridge or valve face 91 concentrically disposed about a second annular ridge or valve face 92 which is so constructed and arranged that when the valve member 89 is moved to its closed position as illustrated in FIGURE 3, the annular ridge or valve face 92 seals the port 85 not only from the atmosphere, but also from the port 86 while the annular ridge or valve face 91 of the valve member 89 simultaneously seals the port 86 from the atmosphere by seating against the surface 84 of the end wall 83.

The valve member 89 is secured to a pair of rod-like members 93 and 94 respectively passing through opening means 95 and 96 in the interior wall means 75 of the housing means 64 so that the left-hand ends 97 and 98 of the rods 93 and 94 are adapted to abut against the disc-like member 69 of the control shaft means 66. The right-hand ends 99 and 100 of the rod-like members 93 and 94 respectively project through openings 101 and 102 in the end wall means 83 of the housing means 64 to respectively engage against the spring switch blades 30 and 31 previously described for the manually operated electrical switch 25 of the control system 10 of FIGURE 1.

As illustrated in FIGURE 8, the switch blades 30 and 31 have their right-hand ends 103 and 104 respectively secured to the housing means 64 by rivet means 105 and 106 and are respectively disposed in electrical contact with the contacts 33 and 34 which can comprise terminal means adapted to be secured to the previously described leads 35 and 36 leading to the plug 37. The left-hand ends 107 and 108 of the spring blades 30 and 31 respectively carry electrical contacts 109 and 110 that are adapted to respectively cooperate with the fixed contact means 24 and 26 carried by the housing means 64 and respectively electrically interconnected to terminal means 111 and 112 adapted to be suitably electrically secured to the previously described leads 23 and 27 of the control system 10 of FIGURE 1.

Thus, it can be seen that when the control knob 68 of the selector means 63 is disposed in the "out" and "off" position illustrated in FIGURE 2, the natural bias of the switch blades 30 and 31 is to the left and moves the rod-like means 93 and 94 to the left against the disc member 69 of the control shaft means 66 to not only move the contacts 109 and 110 out of electrical contact with the fixed contacts 24 and 26 as illustrated in FIGURE 2, but also to move the valve member 89 therewith to the left to fully open the ports 85 and 86 to the atmosphere.

However, when the control knob 68 is moved axially inwardly to the "in" and "on" position of FIGURE 3, the disc portion 69 of the control shaft 66 pushes the push rods 93 and 94 to the right in opposition to the natural bias of the spring blades 30 and 31 to place the contacts 109 and 110 respectively into electrical contact with the fixed contacts 24 and 26 while seating the valve member 89 against the surface 84 to seal the ports 85 and 86 from the atmosphere and from each other as illustrated in FIGURE 3.

Thus, it can be seen that such axial movement of the control knob 68 relative to the housing means 64 of the selector means 63 does not effect the valve member 81. However, rotational movement of the control knob 68 relative to the housing means 64 of the selector means 63 varies the degree of flexure of the valve member 81 against the abutment means 80 to thereby vary the degree of air bleed into the valve seat 77 with such rotational movement of the control knob 68 not effecting movement of the valve member 89 as the disc-like member 69 can rotate relative to rod ends 97 and 98.

The operation of the control system 10 utilizing the selector means 63 of FIGURES 2–8 will now be described.

Assuming that the control system 10 is in its "off" condition as illustrated in FIGURES 1 and 2, the housewife or the like disposes the desired quantity of wet laundry into the dryer 11 and closes the dryer door so that the door operated electrical switch 21 will cause the switch blade 29 to bridge the contacts 28 and 20.

Thereafter, the housewife or the like rotates the control knob 68 relative to the housing means 64 to a desired temperature setting thereof whereby the flexible valve member 81 will be flexed against the abutment means 80 to provide a set amount of aid bleed into the valve seat 77 and, thus, into the conduit means 61.

This manually set variable air bleed means for the pneumatically operated valve means 13 is utilized to cooperate with a thermostatically operated air bleed means 113 of FIGURE 1 that is interconnected to the conduit 60 by a conduit means 114 and disposed upstream from a line restrictor 115, the thermostatically operated bleed means 113 being a fixed bleed means that will progressively increase the amount of air bleed therethrough when the temperature effect of the burner means 12 increases above a predetermined set temperature for the device 13 and the thermostatically air bleed means 113 will decrease the amount of air bleeding into the conduit 114 when the temperature effect of the burner means 12 falls below the fixed temperature effect setting of the thermostatically operated means 113.

Thus, the thermostatically operated air bleed means 113 in cooperation with the manually set air bleed means 62 will control the pneumatically operated valve means 13 in such a manner that the temperature effect of the burner means 12 during the operation of the dryer 11 will be substantially maintained at the selected temperature setting produced by the housewife rotating the control knob 68 to the desired temperature setting thereof as will be apparent hereinafter.

After the control knob 68 has been utilized to select the desired temperature setting of the dryer 11, the housewife or the like pushes axially inwardly on the control knob 68 to move the same from the position illustrated in FIGURE 2 to the position illustrated in FIGURE 3 whereby not only are the conduits 41 and 43 now dead-ended or sealed from the atmosphere, but also the switch blades 30 and 31 now bridge the contacts 33, 24 and 34, 26 to place the coil 15 of the pneumatic pump 14 across the electrical power source to cause continuous operation of the vacuum pump 14. Such operation of the vacuum pump 14 causes an evacuation of the air from the conduit 17 as well as the air from the conduit 41 leading to the port 86 of the selector means 63 so that the resulting pressure differential now created across the valve member 89 when disposed in the position illustrated in FIGURE 3 is sufficient to maintain the valve member 89 in its closed position in opposition to the force of the natural bias of the switch blades 30 and 31 tending to move the same to the left in FIGURE 3 so that the housewife or the like can release the control knob 68 and the same will remain in its "in" and "on" position as illustrated in FIGURE 3 until the vacuum in the line 41 is broken in the manner hereinafter described or the housewife or the like pulls outwardly on the knob 68.

Also, the vacuum pump 14, through the conduit means 44, begins to evacuate the actuator 45 so that the same moves from its deactuated position to its actuated position to interconnect the conduit 44 to the conduit 53 so that the vacuum pump 14 is now interconnected to the conduit means 60 and 43 to operate the actuator means 47, 48, 49 and 13 because the conduit 43 is dead-ended or sealed from the atmosphere and will thereby permit the vacuum pump 14 to evacuate the actuators interconnected to the conduit means 60 previously described.

Even though the manually set variable air bleed means 62 is permitting air in a controlled amount to enter the conduit 61, the vacuum pump 14 begins to evacuate the chamber 58 of the pneumatically operated valve means 13 in such a manner, that the same moves the diaphragm 57 and, thus, the valve member 56 away from the valve seat 55 to the left in FIGURE 1 in opposition to the force of the compression spring 59 to interconnect the source conduit 13' with the burner means 12 so that the issuing fuel at the outlet means 52 will be ignited by the electrical sparks produced by the actuated actuator 47.

The amount of fuel now being directed to the burner means 12 by the pneumatically operated valve means 13 will be varied as the temperature effect of the burner means 12 increases above the selected temperature effect as previously selected by the control knob 68 because the thermostatic device 113 will progressively increase the amount of air adapted to bleed into the conduit 114 and, thus, into the chamber 58 as the temperature effect of the burner means 12 increases and such increased air bleed-in combination with the set fixed amount of air bleeding from the air bleed means 62 into the conduit 61 will cause the valve member 56 of the valve means 13 to move close to the valve seat 55 to reduce the flow of fuel to the burner means 12 so that the valve means 13 will maintain the temperature effect of the dryer means 11 at the temperature effect previously selected by the housewife setting the rotational position of the control knob 68 in the manner previously described.

Thus, the control system 10 continues to operate in the manner previously described until the housewife or the like pulls outwardly on the control knob 68 from its "in" and "on" position of FIGURE 3 to the "out" and "off" position of FIGURE 2 wherein not only is the electrical connection to the pneumatic pump 14 terminated to terminate the source of pneumatic fluid for the control system 10, but also the conduits 41 and 43 are directly interconnected to the atmosphere so that all of the actuators 45, 47, 48, 49 and 13 of the control system 10 are deactuated whereby the valve member 56 of the valve means 13 closes the valve seat 55 so that no more fuel can issue to the main burner means 12 and the system 10 cannot be again operated until the housewife or the like initiates the operation thereof in the manner previously described by pushing in on the control knob 68.

Therefore, it can be seen that this invention not only provides an improved pneumatic control system, but also this invention provides an improved selector means for such a pneumatic control system or the like.

While the form of the invention now preferred has been disclosed as required by the statutes, other forms may be used, all coming within the scope of the claims which follow.

What is claimed is:

1. A selector means for a pneumatic control system comprising a housing means having a pair of valve seats, a pair of valve members carried by said housing for respectively opening and closing said valve seats, and manually operated control means carried by said housing means and being operatively interconnected to said valve members, said control means when moved from a first position thereof to a second position thereof causing movement of one of said valve members from an open position thereof to a closed position thereof without effecting movement of the other valve member, said control means when moved from a third position thereof toward a fourth position thereof causing movement of the other valve member relative to its valve seat to vary the degree of restriction provided by said other valve member and its valve seat without effecting movement of said one valve member.

2. A selector means as set forth in claim 1 wherein said movement of said control means from said first position to said second position is an axial movement of said control means relative to said housing means.

3. A selector means as set forth in claim 1 wherein said movement of said control means from said third position to said fourth position is a rotational movement of said control means relative to said housing means.

4. A selector means as set forth in claim 1 wherein electrical switch means are carried by said housing means, said control means being operatively interconnected to said switch means whereby said switch means are opened when said control means is in said first position thereof and are closed when said control means is moved to said second position thereof.

5. A selector means as set forth in claim 4 wherein said one valve member carries part of said switch means so as to move in unison therewith.

6. A selector means as set forth in claim 1 wherein said housing means carries filter means to filter fluid flow between the restricted valve seat and its associated other valve member.

7. A selector means as set forth in claim 1 wherein said other valve member is flexible, said housing means having abutment means adjacent the valve seat controlled by said other valve member and being engageable by said other valve member, said control means causing said other valve member to flex against said abutment means to vary the restriction provided thereby with its valve seat as said control means is moved between its said third position and its said fourth position.

8. A selector means as set forth in claim 7 wherein said housing means has a threaded part, said control means having a threaded member disposed in threaded relation with said threaded part and carrying said other valve member, said control means changing the threaded relation between said threaded part and said threaded member as said control means is moved between its said third position and its said fourth position to vary the degree of flexure of said other valve member against said abutment means.

9. A selector means as set forth in claim 8 wherein said valve seat controlled by said other valve member is annular, said abutment of said housing means being annular and being concentrically disposed about said annular valve seat in spaced relation therewith.

10. A selector means as set forth in claim 8 wherein said control means is splined to said threaded member so as to cause rotation of said threaded member in unison therewith while permitting axial movement of said control means relative to said threaded member.

11. A selector means as set forth in claim 1 wherein said housing means has another valve seat disposed adjacent said valve seat controlled by said one valve member, said one valve member opening both of said adjacent valve seats when said control means is in said first position thereof and closing both of said adjacent valve seats when said control means is in said second position thereof.

12. A selector means as set forth in claim 1 wherein said control means has an abutment means movable in unison therewith between said first position and said second position of said control means, said one valve member carrying rod means engageable with said abutment means, and means tending to maintain said rod means against said abutment means so that said one valve member tends to follow movement of said control means between its said first position and its said second position.

13. A selector means as set forth in claim 12 wherein said last-named means comprises spring means carried by said housing means.

14. A selector means as set forth in claim 13 wherein said spring means comprise switch blade means.

15. A selector means as set forth in claim 14 wherein said housing means carries fixed electrical contact means, said control means moving said spring blade means against said fixed contact means only when said control means is said second position thereof.

16. A pneumatic control system comprising a pneumatic source creating means, pneumatically operated actuator means, and selector means operatively interconnected to said source creating means and to said pneumatically operated actuator means, said selector means having movable control means which when moved from a first position thereof to a second position thereof actuates said source creating means to create said source of pneumatic fluid and fluidly interconnects said created source to said pneumatically operated actuator means to actuate the same, said control means having a variable air bleed means fluidly interconnected to said actuator means, said control means when moved between a third position thereof and a fourth position thereof varying said air bleed means to vary the degree of actuation of said actuator means by said source.

17. A pneumatic control system as set forth in claim 16 wherein said selector means has a pair of valve seats respectively fluidly interconnected to said source and to said actuator means, said selector means having a pair of valve members operatively interconnected to said control means for respectively opening and closing said valve seats, said control means when moved from said first position thereof to said second position thereof causing movement of one of said valve members from an open position thereof to a closed position thereof without effecting movement of the other valve member, said control means when moved from said third position thereof toward said fourth position thereof causing movement of the other valve member relative to its valve seat to vary the degree of air bleed provided by said other valve member and its valve seat without effecting movement of said one valve member.

18. A pneumatic control system as set forth in claim 17 wherein said movement of said control means from said first position to said second position is an axial movement of said control means relative to said selector means.

19. A pneumatic control system as set forth in claim 17 wherein said movement of said control means from said third position to said fourth position is a rotational movement of said control means relative to said selector means.

20. A pneumatic control system as set forth in claim 17 wherein electrical switch means are carried by said means, said control means being operatively interconnected to said switch means whereby said switch means are opened when said control means is in said first position thereof and are closed when said control means is moved to said second position thereof, said switch means being operatively interconnected to said source creating means to actuate the same when said switch means are closed.

21. A pneumatic control system as set forth in claim 20 wherein said one valve member carries part of said switch means so as to move in unison therewith.

22. A pneumatic control system as set forth in claim 17 wherein said selector means carries filter means to filter fluid flow between the air bleed valve seat and its associated other valve member.

23. A pneumatic control system as set forth in claim 17 wherein said other valve member is flexible, said selector means having abutment means adjacent the valve seat controlled by said other valve member and being engageable by said other valve member, said control means causing said other valve member to flex against said abutment means to vary the restriction provided thereby with its valve seat as said control means is moved between its said fourth position.

24. A pneumatic control system as set forth in claim 23 wherein said selector means has a threaded part, said control means having a threaded member disposed in threaded relation with said threaded part and carrying said other valve member, said control means changing the threaded relation between said threaded part and said threaded member as said control means is moved between its said third position and its said fourth position to vary the degree of flexure of said other valve member against said abutment means.

25. A pneumatic control system as set forth in claim 24 wherein said valve seat controlled by said other valve member is annular, said abutment of said selector means being annular and being concentrically disposed about said annular valve seat in spaced relation therewith.

26. A pneumatic control system as set forth in claim 24 wherein said control means is splined to said threaded member so as to cause rotation of said threaded member in unison therewith while permitting axial movement of said control means relative to said threaded member.

27. A pneumatic control system as set forth in claim 17 wherein said selector means has another valve seat disposed adjacent said valve seat controlled by said one valve member, said one valve member opening both of said adjacent valve seats when said control means is in said first position thereof and closing both of said adjacent valve seats when said control means is in said second position thereof.

28. A pneumatic control system as set forth in claim 17 wherein said control means has an abutment means movable in unison therewith between said first position and said second position of said control means, said one valve member carrying rod means engageable with said abutment means, and means tending to maintain said rod means against said abutment means so that said one valve member tends to follow movement of said control means between its said first position and its said second position.

29. A pneumatic control system as set forth in claim 28 wherein said last-named means comprises spring means carried by said selector means.

30. A pneumatic control system as set forth in claim 29 wherein said spring means comprise switch blade means, said selector means carrying fixed electrical contact means, said control means moving said spring blade means against said fixed contact means only when said control means is said second position thereof.

References Cited

UNITED STATES PATENTS

| | | | |
|---|---|---|---|
| 2,906,098 | 9/1958 | Mayo | 60—60 XR |
| 3,244,198 | 4/1966 | Larkin | 137—636.4 |
| 3,375,685 | 4/1968 | Scott | 60—60 XR |

EDGAR W. GEOGHEGAN, Primary Examiner

U.S. Cl. X.R.

34—48; 91—413; 137—636.4; 263—33